United States Patent [19]
Akiyama et al.

[11] 3,984,848
[45] Oct. 5, 1976

[54] SHUTTER SPEED CONTROL MEANS FOR FOCAL PLANE SHUTTER

[75] Inventors: Kazuhiro Akiyama, Omiya; Shinichiro Fujino, Urawa, both of Japan

[73] Assignee: Fuji Photo Optical Co., Ltd., Omiya, Japan

[22] Filed: May 14, 1974

[21] Appl. No.: 469,847

[30] Foreign Application Priority Data
May 16, 1973 Japan.................................. 48-54452

[52] U.S. Cl................................ 354/51; 354/237; 354/242; 354/256; 354/266
[51] Int. Cl.²............................................ G03B 9/64
[58] Field of Search................ 354/50, 51, 237–239, 354/241–244, 256, 258–260, 266–267

[56] References Cited
UNITED STATES PATENTS

| | | | |
|---|---|---|---|
| 2,928,326 | 3/1960 | Loose et al. ........................ | 354/243 |
| 3,630,136 | 12/1971 | Kitai ................................... | 354/258 |
| 3,683,767 | 8/1972 | Sahara ................................ | 354/51 |
| 3,766,839 | 10/1973 | Furusawa et al. ................ | 354/242 X |
| 3,852,778 | 12/1974 | Iura .................................... | 354/239 X |
| 3,852,785 | 12/1974 | Ogihara et al. .................... | 354/239 |
| 3,872,488 | 3/1975 | Oshima ............................. | 354/242 X |

FOREIGN PATENTS OR APPLICATIONS
1,215,510 4/1966 Germany ........................... 354/256

*Primary Examiner*—L. T. Hix
*Assistant Examiner*—J. A. LaBarre

[57] ABSTRACT

The start of the leading curtain or the trailing curtain of a focal plane shutter is controlled to obtain an accurate exposure time. A delay means is provided in the mechanism for releasing the leading curtain or in the mechanism for releasing the trailing curtain. The difference between the delay time of the start of the leading curtain and the delay time of the start of the trailing curtain is controlled to be equal to the constant time during which the leading curtain runs overlapping with the trailing curtain. In one embodiment, an inertia member is provided in the vicinity of the curtain release member to delay the movement of the curtain release member. In another embodiment, an electric delay circuit is provided to delay the start of the trailing curtain. In both embodiments, the time of delay of the start of the curtain can be controlled.

6 Claims, 6 Drawing Figures

SHUTTER SPEED CONTROL MEANS FOR FOCAL PLANE SHUTTER

BACKGROUND OF THE INVENTION

1. Field of the Invention

This invention relates to an electric shutter control means, and more particularly to a device for controlling the shutter speed of a focal plane type electric shutter in which the exposure time determined by an electric circuit is modified by a mechanical delay means.

2. Description of the Prior Art

In general, the leading curtain and the trailing curtain of a focal plane shutter are overlapped when the shutter is closed to prevent leakage of light therethrough. Therefore, the distance from the starting position of the leading curtain to the position where the leading curtain begins to expose the film to light incident into the camera is not equal to the distance from the starting position of the trailing curtain to the position where the trailing curtain begins to cover the film. Because of this difference, it is very difficult to practice to make the time between the start of the leading curtain and the trailing curtain, i.e. the delay of the start of the trailing curtain with respect to the start of the leading curtain, equal to the exposure time. In the manufacture of this type of electric focal plane shutter, therefore, there are great design and production difficulties in adjusting the starting position of the leading curtain, determining the proper amount of overlapping of the shutter curtains, adjusting the operation time of various mechanical levers and other members to move the shutter curtains and so forth.

SUMMARY OF THE INVENTION

In the light of the foregoing observations and description of the prior art, the primary object of the present invention is to provide a device for controlling the shutter speed of a focal plane type electric shutter in which the shutter speed is controlled with high accuracy.

Another object of the present invention is to provide a shutter speed control device for a focal plane type electric shutter in which there is required no delicate adjustment of the starting position of the leading and trailing curtains and the operation time of various mechanical elements to move the shutter curtains.

Still another object of the present invention is to provide a shutter speed control device for a focal plane type electric shutter in which a delay means is provided in addition to a conventional electric delay circuit for delaying the start of the leading or trailing curtain, whereby the start of the leading or trailing curtain is controlled to perform accurate control of the shutter speed.

In accordance with the present invention, a delay means is provided in association with the curtain operating mechanism to delay the start of the trailing curtain. In another embodiment of the present invention, the start of the leading curtain is delayed. The delay of the leading or trailing curtain is so determined that the difference between the delay time of the leading curtain and that of the trailing curtain is equal to the time during which the leading curtain runs overlapping with the trailing curtain.

The above objects, features and advantages of the present invention will be made apparent and more explicit from the following detailed description of the preferred embodiments thereof taken in conjunction with the accompanying drawings as follows.

DESCRIPTION OF THE PREFERRED EMBODIMENTS

Before describing in detail the preferred embodiments of the present invention, it will be helpful to explain the fundamental concept of the invention.

Figure 1:
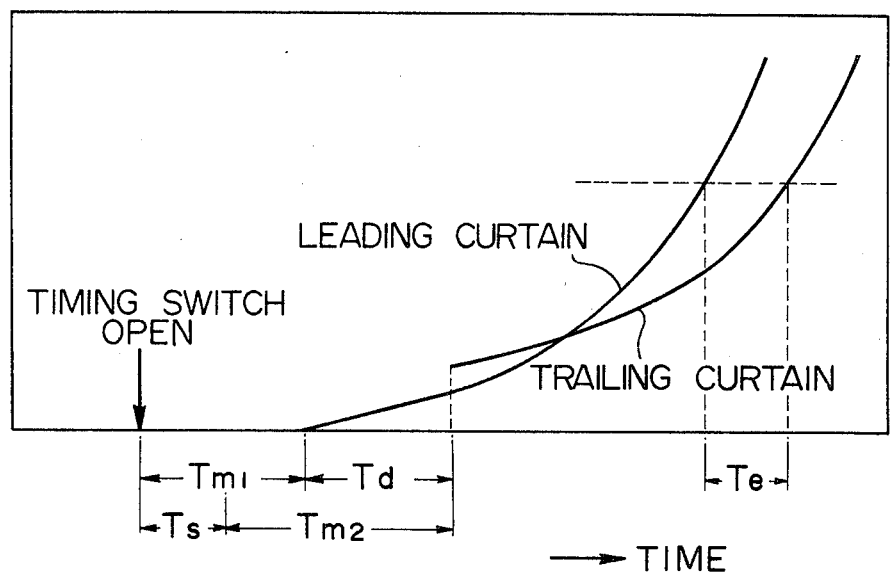
FIG. 1 is a graphical representation which shows the movement of the shutter curtains with respect to time.

As shown in FIG. 1, the exposure time $Te$ is not usually equal to the time of delay $Td$ of the start of the trailing curtain with respect to the start of the leading curtain, since the distance from the start position of the leading curtain to the position where the leading curtain begins to expose the film is different from the distance from the start position of the trailing curtain to the position where the trailing curtain begins to cover the film. Usually, in case of the shutter speed of 1/1000 sec. (1 ms), the time of delay of the start of the trailing curtain with respect to the leading curtain is about 4 ms. The relation between the exposure time $Te$ and the time of delay $Td$ is represented by the following formula, $$Td = Te + Tc, \qquad \text{Formula (1)}$$

where $Tc$ is a constant time which is usually about 3 ms. If the time from the start of the timing switch to the start of the leading curtain is defined as $Tr1$ and the time from the start of the timing switch to the start of the trailing curtain is defined as $Tr2$, then as shown in FIG. 1, $Tr1$ equals $Tm1$ and $Tr2$ equals $Ts + Tm2$, where $Tm1$ is the time of delay of the leading curtain owing to the mechanical delay of the mechanism for starting the leading curtain, $Tm2$ is the time of delay of the trailing curtain and $Ts$ is the counting time controlled by the electric circuit including a photodetector. Therefore, the time of delay $Td$ which is equal to $Tr2 - Tr1$ can be represented as follows, $$Td = Tr2 - Tr1 = Ts + (Tm2 - Tm1). \qquad \text{Formula (2)}$$

From the formulae (1) and (2), $$Ts + (Tm2 - Tm1) = Te + Tc. \qquad \text{Formula (3)}$$

Since the counting time $Ts$ is determined in accordance with the illumination of the object to be photographed by use of an electric exposure control circuit including a photodetector and a capacitor charged with the output current of the photodetector, it is practically desirable to make the counting time $Ts$ equal to said exposure time $Te$. Therefore, in order that the exposure time may be accurately determined with little error, the following formula is required to be satisfied, $$Tc = Tm2 - Tm1. \qquad \text{Formula (4)}$$

This formula means that the difference between the mechanical delay $Tm1$ of the leading curtain at the time of the start thereof and that $Tm2$ of the trailing curtain should be equal to the constant time $Tc$ which corresponds to the time in which the leading curtain runs overlapping with the trailing curtain.

The present invention is based on the above consideration and provides an exposure time controlling means in which the leading curtain or the trailing curtain is controlled to have a delay corresponding to the above delay $Tm1$ or $Tm2$ to satisfy the Formula (4). In accordance with the present invention, the timing of the start of the leading curtain or the trailing curtain which is controlled by an electric exposure control means is controlled to make the difference between the delays of the curtains, i.e. $|Tm1 - Tm2|$, equal to the constant delay time $Tc$, whereby the exposure time is controlled with high accuracy.

Figure 2:
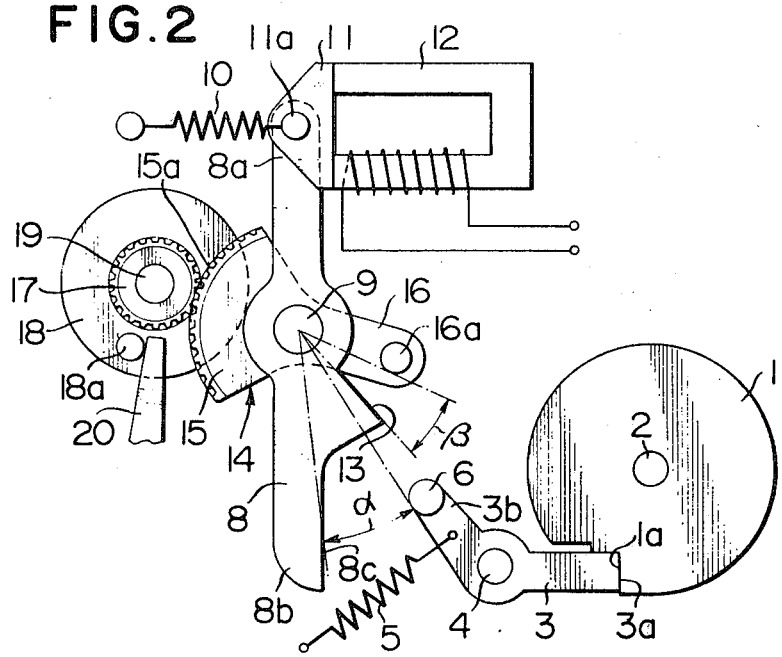
FIG. 2 is a plan view showing an embodiment of the mechanism for controlling the shutter speed in a focal plane type electric shutter wherein elements of the mechanism are in the ready position.
Figure 3:
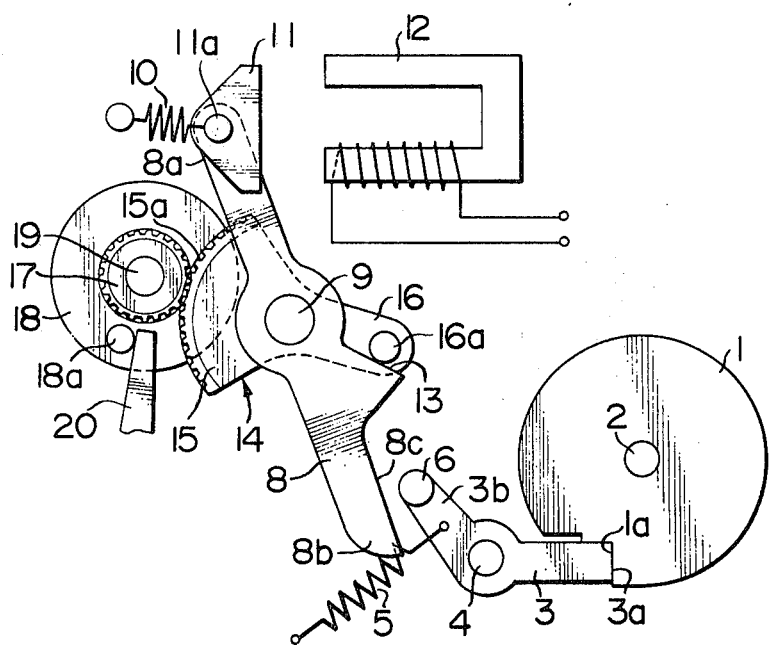
FIG. 3 is a plan view showing the above embodiment of the invention wherein the elements of the mechanism are in the position where the delay effect is started.

Now, a preferred embodiment of the present invention will be described in detail with reference to FIGS. 2 and 3. The embodiment shown in FIGS. 2 and 3 is a control device which delays the start of the trailing curtain by a mechanical means to control said time $Tm2$. A trailing curtain holding member 1 rotatably mounted on a fixed shaft 2 is engaged with a stop lever 3 which is rotatably mounted on a shaft 4 and spring urged in the counterclockwise direction by a tension spring 5. The trailing curtain holding member 1 is urged in the clockwise direction and prevented from rotating clockwise by said stop lever 3 when the stop lever 3 is in the stopping position being pulled by said tension spring 5. The stopping lever 3 has two arms 3a and 3b one of which is engaged with the cut-away portion 1a of the trailing curtain holding member 1 and the other of which is provided with a pin 6 fixed thereto. A curtain release lever 8 is rotatably mounted on a fixed shaft 9 and spring urged in the counterclockwise direction by means of a tension spring 10. One end 8a of the curtain release lever 8 is provided with an iron piece 11 which is to be attracted by an electromagnet 12. The iron piece 11 is rotatably mounted to the end 8a of the curtain release lever 8 by a pivot 11a. The other end 8b of the curtain release lever 8 extends into a region of the rotation of the arm 3b of the stop lever 3 so that the stop lever 3 may be rotated clockwise by the counterclockwise rotation of the curtain release lever 8 a side face 8c of the end 8b of which abuts on the pin 6 on the stop lever 3 during the counterclockwise rotation thereof. The curtain release lever 8 is provided with an abutment face 13 on the same side thereof as that having a face which abuts against said pin 6 on the stop lever 3. Concentrically with the curtain release lever 8 is rotatably provided a sector gear member 14 on the shaft 9. The sector gear member 14 has a sector gear portion 15 with teeth 15a and an arm 16 having at the end thereof a pin 16a fixed thereto. The pin 16a is located in such a position that it will abut on the abutment face 13 of the curtain release lever 8 when the release lever 8 rotates counterclockwise. The teeth 15a of the sector gear member 15 are engaged with a gear 17 fixed to an inertia disc 18 concentrically therewith. The inertia disc 18 is rotatably mounted on a fixed shaft 19. A pin 18a is fixed on the inertia disc 18. A delay time control lever 20 is provided in engagement with the pin 18a to determine the starting position of the inertia disc 18. The delay time control lever 20 is movable along the circular path of the pin 18a so that the position of the pin 18a abutting thereon can be changed by moving the control lever 20. In FIG. 2, the angle between the pin 16a fixed on the arm 16 of the sector gear member 14 and the abutment face 13 of the curtain release lever 8 on which the pin 16a abuts is denoted by $\beta$. The angle between the pin 6 fixed on the arm 3b of the stop lever 3 and the side face 8c of the end 8b of the curtain release lever 8 is denoted by $\alpha$.

Now, the operation of the above described first embodiment of the present invention will be described in detail referring to FIGS. 2 and 3. When the leading curtain is started by the shutter release operation, an electric delay circuit is started to measure the illumination of the object to be photographed. When a time corresponding to the illumination has lapsed, the electromagnet 12 is deenergized to release the iron piece 11 and rotate the curtain release lever 8 counterclockwise. When the electromagnet 12 is deenergized, the curtain release lever 8 is rotated counterclockwise by the tension of the spring 10. When the curtain release lever 8 is rotated counterclockwise by the angle of $\alpha$, the side face 8c of the lever 8 abuts on the pin 6 on the stop lever 3 and starts to rotate the stop lever 3 clockwise and release the trailing curtain holding member 1. However, before the curtain release lever 8 is rotated by the angle of $\alpha$, the abutment face 13 of the lever 8 abuts on the pin 16a on the arm 16 of the sector gear member 14 when the lever 8 is rotated by the angle of $\beta$ as shown in FIG. 3. After the abutment face 13 of the lever 8 abuts on the pin 16a on the sector gear member 14, the sector gear member 14 is rotated together with the curtain release lever 8. Then, the curtain release lever 8 abuts on the pin 6 fixed to the stop lever 3. After the release lever 8 abuts on the pin 6, the stop lever 3 is moved clockwise by the lever 8 by the force of the spring 10 which overcomes the force of the spring 5. Upon release of the stop lever 3 from the cut-away portion 1a of the trailing curtain holding member 1, the member 1 is rotated clockwise to release the trailing curtain and make it run after the leading curtain. In order that the curtain release lever 8 may abut on the pin 16a on the sector gear member 14 before it abuts on the pin 6 on the stop lever 3, the angle $\alpha$ between the side face 8c and the pin 6 must be larger than the angle $\beta$ between the abutment face 13 and the pin 16a. The angle $\alpha$ is fixed, but the angle $\beta$ can be changed as follows. By moving the delay time control lever 20 along the circular path of the pin 18a, the pin 18a which is in contact with the lever 20 is moved to rotate the inertia disc 18. When the inertia disc is rotated clockwise, the sector gear member 14 is rotated counterclockwise through the engagement of the gear 17 and the teeth 15a, and the pin 16a fixed on the arm 16 of the sector gear member 14 is moved further from the abutment face 13 of the release gear 8 to increase the angle $\beta$. If the inertia disc 18 is rotated counterclockwise by moving the control lever 20 counterclockwise, the sector gear member 14 is rotated clockwise to move the pin 16a closer to the abutment face 13 of the lever 8 to reduce the angle $\beta$. As the difference between the angle $\alpha$ and $\beta$ increases, the delay of the start of the trailing curtain after the energization of the electromagnet 12 increases, and vice versa. In accordance with this embodiment of the invention, the time defined by $|Tm1 - Tm2|$ is made equal to $Tc$ as required by controlling the time $Tm2$. Therefore, the exposure time $Te$ is accurately controlled by the electric circuit.

Figure 4:
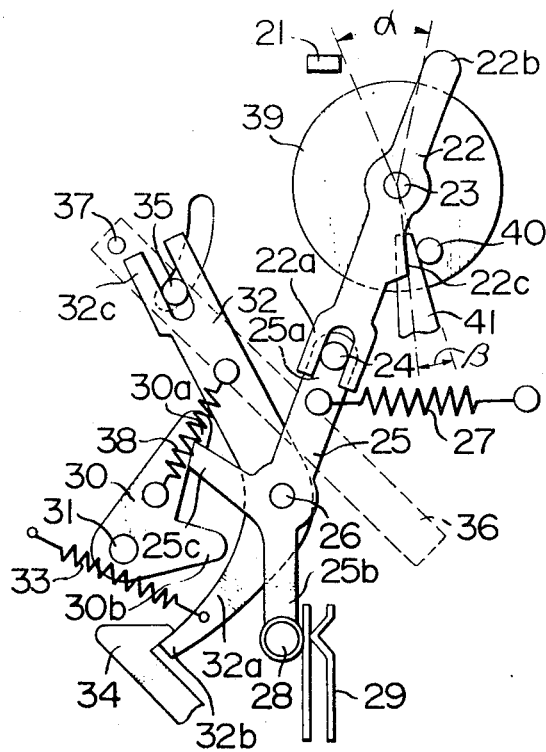
FIG. 4 is a plan view showing another embodiment of the mechanism for controlling the shutter speed in a shutter wherein elements of the mechanism are in the ready position.

A second embodiment of the present invention in which the start of the leading curtain is controlled is described hereinbelow with reference to FIGS. 4 and 5. In this second embodiment, the timing of the start of the leading curtain is delayed by a mechanical means to make the time $|Tm1 - Tm2|$ equal to the constant time $Tc$.

A leading curtain holding member 21 is located in the region of rotation of a curtain release lever 22 which is rotatably mounted on a fixed shaft 23. The curtain release lever 22 has a forked end 22a at an end thereof. The other end 22b extends radially so that it may push the leading curtain holding member 21 leftward when the curtain release lever 22 rotates counterclockwise. The forked end 22a of the curtain release lever 22 is engaged with a pin 24 fixed at an end of an arm 25a of a Y-shaped lever 25. The Y-shaped lever 25 has three arms 25a, 25b and 25c and is rotatably mounted on a fixed shaft 26. The first arm 25a having at the end thereof said pin 24 is further provided with a tension spring 27 which urges the Y-shaped lever in the clockwise direction. The second arm 25b is provided at the end thereof a pin 28 which is to close and open a timing switch 29. The timing switch 29 is urged to normally open by itself and pushed to close by the pin 28 as shown in FIG. 4. The timing switch 29 is connected with an electric circuit to measure the illumination of the object and operate an electromagnet (not shown) after the time corresponding to the illumination has lapsed. When the timing switch 29 is opened, the charging of a capacitor in the circuit is started. The third arm 25c is engaged with a V-shaped hook lever 30 at a hook portion 30a thereof so that the clockwise rotation of the Y-shaped lever 25 is prevented by the engagement of the third arm 25c with the hook portion 30a of the V-shaped hook lever 30. The V-shaped hook lever 30 is rotatably mounted on a fixed shaft 31 and has an arm 30b extending toward the Y-shaped lever 25. The arm 30b of the hook lever 30 extends in the region of movement of an arc portion 32a of a mirror swing-up lever 32 which is in turn rotatably mounted on said fixed shaft 26 so that the arm 30b may be pushed by the arc portion 32a of the lever 32 when the lever 32 rotates clockwise. The mirror swing-up lever 32 is urged in the clockwise direction by means of a tension spring 33 and is engaged at an end 32b thereof with a hook 34 as shown in FIG. 4. The other end 32c of the mirror swing-up lever 32 is fork-shaped and engaged with a pin 35 fixed to a swing-up mirror 36 which is rotatably mounted on a fixed shaft 37. Said hook 34 is released from the end 32b of the mirror swing-up lever 32 upon operation of the shutter release. The mirror swing-up lever 32 is connected with the V-shaped hook lever 30 by means of a tension spring 38 so that the hook lever 30 may be rotated clockwise when the mirror swing-up lever 32 is rotated counterclockwise to return to the original position. An inertia disc 39 is rotatably mounted on said fixed shaft 23 concentrically with said curtain release lever 22 to be independently rotated thereof. The inertia disc 39 is provided with a pin 40 fixed thereto. Said curtain release lever 22 is provided with an abutment face 22c at a position where the pin 40 abuts when the lever 22 rotates counterclockwise. A delay time control lever 41 is provided in contact with the pin 40 to move the pin 40 to a predetermined position. The angle between the leading curtain holding member 21 and the end 22b of the curtain release lever 22 is denoted by $\alpha$, and the angle between the pin 40 and the abutment face 22c is denoted by $\beta$. In the above described mechanism, the curtain release lever 22 is rotated counterclockwise by the clockwise movement of the Y-shaped lever 25 which is initiated by the counterclockwise rotation of the hook lever 30 which is in turn initiated by the clockwise rotation of the mirror swing-up lever 32 accompanying the swing up of the mirror 36, upon release of the shutter. In this mechanism, the time from the start of the counterclockwise movement of the curtain release lever 22 to the abutment of the end 22b thereof on the leading curtain holding member 21 is changed by use of the inertia disc 39. The operation of the inertia disc upon control of the delay time of the start of the leading curtain will be described hereinbelow.

In operation of the above-described mechanism for controlling the delay of start of the leading curtain, the hook 34 is released from the end 32b of the mirror swing-up lever 32 upon depression of a shutter release member (not shown)). When the hook 34 is released, the mirror swing-up lever 32 is rotated clockwise by the tension of the tension spring 33. By the clockwise rotation of the mirror swing-up lever 32, the arm 30b of the V-shaped hook lever 30 is pushed leftward of the arc portion 32a of the mirror swing-up lever 32 and the hook portion 30a thereof is disengaged from the end of the arm 25c of the Y-shaped lever 25. Simultaneously with this motion, the mirror 36 is swung up by the clockwise rotation of the mirror swing-up lever 32. Upon disengagement of the hook portion 30a from the arm 25c, the Y-shaped lever is rotated clockwise by the tension of the tension spring 27. Upon clockwise rotation of the Y-shaped lever 25, the pin 28 is separated from the timing switch 29 and the switch 29 is opened to start charging the capacitor in the electric exposure time control circuit. Further, the clockwise rotation of the Y-shaped lever 25 causes the curtain release lever 22 to rotate counterclockwise through the engagement of the pin 24 and the forked end 22a of the lever 22.

Figure 5:
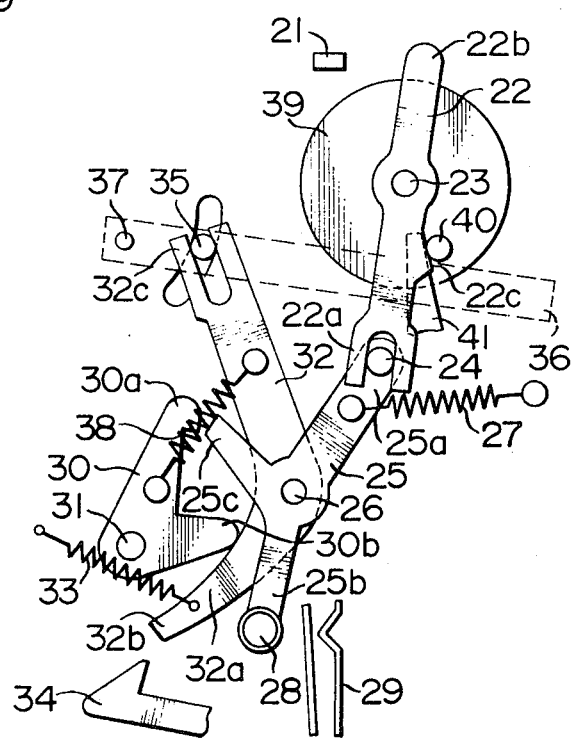
FIG. 5 is a plan view showing the second embodiment wherein the elements are in the position where the delay effect is started.

When the curtain release lever 22 is rotated by the angle of $\beta$ in the counterclockwise direction, the abutment face 22c of the lever 22 abuts on the pin 40 and starts to rotate the inertia disc 39 together therewith as shown in FIG. 5. Then, when the curtain release lever 22 is rotated by the angle of $\alpha$, the end 22b of the lever 22 starts to move the leading curtain holding member 21 and starts the leading curtain. In order that the rotation of the curtain release lever 22 may be delayed by the inertia disc, the angle $\beta$ must be smaller than the angle $\alpha$. The angle $\beta$ can be changed by moving the delay time control lever 41 along the circular path of the pin 40. In FIG. 4, by moving the control lever 41 to the right, the start of the leading curtain is quickened and vice versa. In accordance with this embodiment of the invention, the time defined by $|Tm1 - Tm2|$ is made equal to $Tc$ as required by controlling the time $Tm1$. Therefore, the exposure time $Te$ is accurately controlled by the electric circuit.

Figure 6:
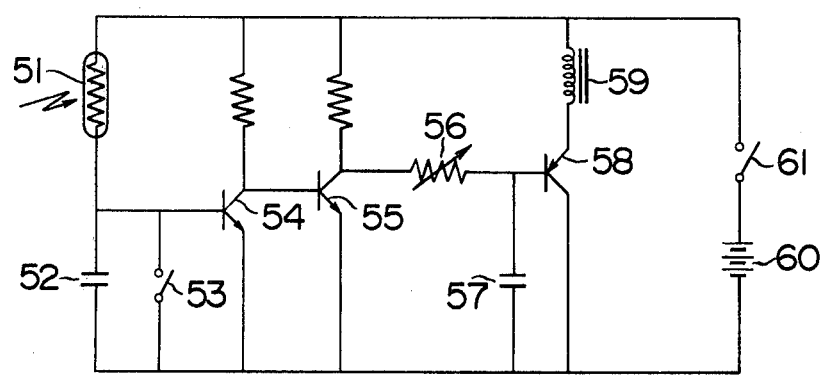
FIG. 6 is a circuit view showing still another embodiment of the invention in which an electric circuit is used to delay the start of the trailing curtain.

A third embodiment of the present invention will be described hereinbelow with reference to FIG. 6 which shows an electric circuit. This embodiment is an electric control means which controls the delay of the start of the trailing curtain to control the time $Tm2$. Referring to FIG. 6, a photodetector 51 and a capacitor 52 constitute a time constant circuit. A timing switch 53 is connected in parallel with the capacitor 52 so that the charging of the capacitor 52 may be initiated by opening the timing switch 53. The timing switch 53 is closed until the shutter is released and opened at the time of the shutter release. The connecting point between the photodetector 51 and the capacitor 52 is connected with the base of a transistor 54. The collector of the transistor 54 is connected with the base of a second transistor 55. The second transistor 55 is connected with a second time constant circuit consisting of a variable resistor 56 and a capacitor 57. The second time constant circuit is connected with the base of a third transistor 58. The emitter of the third transistor 58 is connected with an electromagnet 59 which is associated with a curtain release member to start the trailing curtain by demagnetization thereof. The above elements are connected with an electric source 60 by way of a power switch 61.

In operation of the above described circuit, the timing switch 53 is opened upon operation of a shutter release member. When the timing switch 53 is opened, the capacitor 52 is started to be charged according to the resistance of the photodetector 51 which measures the illumination of the object to be photographed. When a time corresponding to the illumination has lapsed, the capacitor 52 is fully charged and the transistor 54 is turned ON and the potential at the collector of the transistor 54 is lowered. Accordingly, the base current of the second transistor 55 is lowered and the second transistor 55 is turned OFF, and the time constant circuit consisting of the variable resistor 56 and the capacitor 57 is energized. When a time determined by the time constant of the variable resistor 56 and the capacitor 57 has lapsed, the base potential of the third transistor 58 is raised up to a predetermined value and the third transistor 53 is turned OFF to demagnetize the electromagnet 59. By the demagnetization of the electromagnet 59, the trailing curtain is started by a conventionally known type of trailing curtain release means. In accordance with this embodiment of the invention, the timing of the start of the trailing curtain is delayed by the second time constant circuit. The delay time is controlled by the variable resistor to make the time $Tm2$ satisfy the formula, $Tc = |Tm1 - Tm2|$. Thus, the exposure time $Te$ is accurately controlled in accordance with this embodiment of the invention.

We claim:

1. In a focal plane shutter which is controlled by an electric exposure control circuit including a time constant circuit consisting of a photodetector and a capacitor, a device for delaying the start of a shutter curtain comprising, first means for releasably holding a leading curtain, second means for releasably holding a trailing curtain, a first curtain release member for releasing said first curtain holding means, a second curtain release member for releasing said second curtain holding means, said second curtain release member being connected with an electromagnet which is operated by the output of said time constant circuit, and mechanical delay means engageable with one of said curtain release members for delaying the start of the movement thereof to release said curtain holding means, wherein the time of the delay obtained by said mechanical delay means being changeable and controlled to satisfy the following condition:

$$Tc = |Tm1 - Tm2|,$$

where the time $Tc$ is a constant time during which the leading curtain runs overlapping with the trailing curtain, $Tm1$ is a delay time of the start of the leading curtain upon mechanical release thereof, and $Tm2$ is a delay time of the start of the trailing curtain upon mechanical release thereof.

2. A device for delaying the start of a shutter curtain in a focal plane shutter as claimed in claim 1 wherein one of said curtain release members is a lever rotatable by an angle larger than a predetermined angle of $\alpha$ to release one of said curtain holding means, said lever being brought into engagement with an inertia member when the lever rotates by an angle of $\beta$, said angle of $\beta$ being selected to be smaller than the angle of $\alpha$ so that said lever may be engaged with said inertia member before said lever releases said curtain holding means whereby the rotation of the lever is slowed down by the inertia member engaged therewith and the release of the curtain holding means is delayed.

3. A device for delaying the start of a shutter curtain in a focal plane shutter as claimed in claim 2 wherein said angle of $\beta$ is made changeable to control the time of the delay.

4. A device for delaying the start of a shutter curtain in a focal plane shutter as claimed in claim 3 wherein said lever releases said first curtain holding means so that said inertia member delays the release of said first curtain holding means and consequently delays the start of the leading curtain.

5. A device for delaying the start of a shutter curtain in a focal plane shutter as claimed in claim 4 wherein said first curtain release member is connected with a first arm of a rotatable three armed lever, a second arm of which is connected with a timing switch of the time constant circuit and a third arm of which is connected with a mirror swing-up mechanism, and the movement of said mirror swing-up mechanism causes said three armed lever to rotate for moving said first curtain release member and opening said timing switch to charge said capacitor of the time constant circuit.

6. A device for delaying the start of a shutter curtain in a focal plane shutter as claimed in claim 3 wherein said lever releases said second curtain holding means so that said inertia member delays the release of said second curtain holding means and consequently delays the start of the trailing curtain.

* * * * *